United States Patent [19]

Shitaohzono et al.

[11] Patent Number: 5,691,403
[45] Date of Patent: Nov. 25, 1997

[54] BIODEGRADABLE COMPOSITIONS

[75] Inventors: Tetsuya Shitaohzono; Akira Muramatsu, both of Shizuoka; Jiro Hino, Kanagawa, all of Japan

[73] Assignee: Nihon Shokuhin Kako Co., Ltd., Japan

[21] Appl. No.: 531,653

[22] Filed: Sep. 21, 1995

[30]     Foreign Application Priority Data

Sep. 28, 1994 [JP] Japan ................................ 6-231954
Apr. 20, 1995 [JP] Japan ................................ 7-095168

[51] Int. Cl.$^6$ .......................... C08L 101/00; C08L 3/02; C08L 67/04
[52] U.S. Cl. ................... 524/47; 525/54.3; 525/54.31; 536/123
[58] Field of Search .................. 524/47; 525/54.3, 525/54.31; 536/123

[56]         References Cited

U.S. PATENT DOCUMENTS

| 4,016,117 | 4/1977 | Griffin ........................... 524/47 |
| 5,070,122 | 12/1991 | Vanderbilt et al. .............. 524/47 |
| 5,162,392 | 11/1992 | Wool et al. ...................... 523/128 |

FOREIGN PATENT DOCUMENTS

| A0530987 | 3/1993 | European Pat. Off. . |
| 52-21530 | 6/1977 | Japan . |
| 52-42187 | 10/1977 | Japan . |
| 2-14228 | 1/1990 | Japan . |
| 3-31333 | 2/1991 | Japan . |
| 3-56543 | 3/1991 | Japan . |
| 3-70752 | 3/1991 | Japan . |
| 3-74445 | 3/1991 | Japan . |
| 3-74446 | 3/1991 | Japan . |
| 4-248851 | 9/1992 | Japan . |
| 5-39381 | 2/1993 | Japan . |
| 5-331315 | 12/1993 | Japan . |
| 6-207047 | 7/1994 | Japan . |
| WO9403543 | 2/1994 | WIPO . |
| WO9413735 | 6/1994 | WIPO . |

OTHER PUBLICATIONS

Database WPI, Derwent Publications Ltd., Week 9231, Jun. 1992.

*Primary Examiner*—Nathan M. Nutter
*Attorney, Agent, or Firm*—Burns, Doane, Swecker & Mathis, L.L.P.

[57]            ABSTRACT

Disclosed is biodegradable compositions comprising a biodegradable resin and starch, wherein fat or oil treated starch or its gelatinized product is utilized as the starch and thereby its production cost and biodegradability is improved without losing its mechanical properties. Biodegradable compositions comprising a gelatinized product of fat or oil treated starch and a biodegradable resin. A process for the production of the biodegradable composition comprising a gelatinized fat or oil treated starch and a biodegradable resin described above, which comprises heating and kneading fat or oil treated starch and a biodegradable resin in the presence of water or water and a plasticizer.

12 Claims, No Drawings

BIODEGRADABLE COMPOSITIONS

BACKGROUND OF THE INVENTION

The present invention relates to a composition comprising a biodegradable resin and starch. More precisely, it relates to a biodegradable composition comprising a biodegradable resin and starch, wherein fat or oil treated starch or its gelatinized product is utilized as the starch and thereby its production cost and biodegradability is improved without losing its mechanical properties. The present invention also relates to a process for production of the comosition.

Recently, biodegradable resins have been intensively researched and developed from the viewpoint of environmental protection of the planet. These resins are classified into groups of those derived from chemical synthesis such as aliphatic polyesters, polycaprolactones, polylactic acids and polyvinyl alcohols, those derived from microorganisms such as polyhydroxybutyrate/valerate copolymers and those derived from naturally occurring materials such as acetylcelluloses and the like. Further, it has been proposed to add starch to these resins to reduce their cost and improve their biodegradability and such techniques have already been practically used to a certain extent.

For example, Japanese Patent Publication (KOKOKU, hereinafter referred to as "JP-B") Nos. 52-21530 and 52-42187 disclose composite materials comprising starch and a resin which is not biodegradable such as polyethylene and polypropylene and, as such materials, a composite material of polypropylene and starch is commercially available under the trade name of ECOSTAR (Ogiwara Kogyo Co.,Ltd.). However, though shapes of articles composed of these composite materials may be collapsed by the degradation of the starch, resins themselves are not decomposed and remain as they are. Therefore, they have not solved the problems of environmental pollution.

Japanese Patent Un-examined Publication (KOKAI, hereinafter referred to as "JP-A") Nos. 2-14228, 3-31333, 4-248851, 5-331315 and 6-207047, for example, also disclose composite materials comprising resins and starch. While biodegradability of the composite materials disclosed in these patent documents are improved by the addition of starch, they have a drawback that their mechanical properties such as strength and elongation are markedly lowered and they become brittle. Therefore, the addition of starch to resins may be practically possible in a certain limited amount.

JP-A-5-39381 discloses a composite material comprising polylactic acid which is biodegradable by itself and starch and/or modified starch. In this material, by the addition of starch and/or modified starch, the degradation rate of polylactic acid may be improved and hardness of the material may be controlled to improve its processibility. However, while biodegradability and the like may be improved by the addition of starch to resin, it also has a drawback that its mechanical properties such as strength and elongation are markedly lowered and they become brittle. Therefore, the addition amount of starch to resin is limited in practical use.

Biodegradable resin compositions comprising various modified starch products have also been known. Those materials include, for example, biodegradable compositions containing, as the starch component, starch graft copolymers (JP-A-3-56543), anionic modified starch (JP-A-3-70752), cationic modified starch (JP-A-3-74445) and starch chemically modified so that it contains hydroxyalkyl groups and/or alkyl ether groups and/or ester groups (JP-A-3-74446).

However, these biodegradable composition comprising modified starch products also cannot sufficiently prevent loss of their mechanical properties.

Therefore, it has been desired to provide biodegradable compositions having further improved mechanical properties and biodegradability. In particular, it is desired to provide biodegradable compositions having a high content of starch from the viewpoints of improving biodegradability and reducing cost.

Accordingly, the object of the present invention is to provide a composite composition comprising a resin and starch and having improved biodegradability, which shows mechanical properties substantially comparable to those of the resin alone and excellent biodegradability.

SUMMARY OF THE INVENTION

The present inventors had found that the object mentioned above can be achieved by mixing a biodegradable resin with fat or oil treated starch. The present inventors had also found that the object mentioned above can be achieved by mixing a biodegradable resin with gelatinized product of fat or oil treated starch.

Incidentally, JP-A-5-39381 mentioned above also discloses mixing of polylactic acid and starch. However, it does not disclose nor suggest the use of fat or oil treated starch as the modified starch component. Solubilized starch, carboxymethylated starch as well as acetylated starch disclosed in the working examples of this patent document could not maintain mechanical properties of the resin, unlike the fat or oil treated starch.

Therefore, the present invention relates to biodegradable compositions comprising fat or oil treated starch and a biodegradable resin.

The present invention also relates to biodegradable compositions comprising a gelatinized product of fat or oil treated starch and a biodegradable resin.

The present invention further relates to a process for the production of the biodegradable composition comprising a gelatinized fat or oil treated starch and a biodegradable resin described above, which comprises heating and kneading fat or oil treated starch and a biodegradable resin in the presence of water or water and a plasticizer.

DETAILED EXPLANATION OF THE INVENTION

The present invention will be further explained in detail hereinafter.

The fat or oil treated starch used for the present invention is a material which has been known heretofore.

For example, it may be fat or oil treated starch produced by overdrying fat or oil and starch (JP-B-45-32878).

This fat or oil treated starch may be obtained by allowing one or more oils, fats, materials analogous to oils or fats, aliphatic acids or derivatives thereof to adsorb on starch and aging them by heating. The fats and oils may be vegetable oils or animal fats or oils, and include, for example, soybean oil, rapeseed oil, linseed oil, olive oil, lard and fish oils. The materials analogous to fat or oil may be phospholipids such as soybean lecithin, monoglycerides, diglycerides and the like. The aliphatic acids are not particularly limited, so long as they are constituents of oils or fats.

The aliphatic acid derivatives may be usual synthetic esters, amides, salts of aliphatic acids and the like, and the esters of aliphatic acids may be, for example, methyl alcohol esters, ethyl alcohol esters and amyl alcohol esters of aliphatic acids. The amides of aliphatic acids may be amides of the aliphatic acids mentioned above and amides of aliphatic acids and amino acids. The salts of aliphatic acids may be alkali metal salts such as sodium and potassium salts, alkaline earth metal salts such as calcium and magnesium salts, ammonium salts of aliphatic acids and the like.

Another example of the fat or oil treated starch is oil treated starch wherein liver oil is used as the oil (JP-A-53-115826).

The oil treated starch utilizing liver oil may be obtained by adding liver oil, a kind oil, to starch powder and sufficiently mixing them to cause adsorption. The "liver oil" herein used may be fatty oils obtained from fish livers such as cod liver oil and shark liver oil as well as fish oils such as cuttlefish oil, whale liver oil and sardine oil and they may be used alone or in any combination thereof.

Also used in the present invention is fat or oil treated starch which has been produced by mixing starch with fat or oil having a high iodine value, for example, an iodine value of not less than 130, other than the liver oils mentioned above, and allowing the fat or the oil to adsorb on the starch (JP-A-54-11247).

The fat or oil having an iodine value of not less than 130 may be animal oils or vegetable oils. Examples of the fat or oil having an iodine value of not less than 130 are safflower oil (iodine value: 122 to 150), sesame oil (iodine value: 162 to 208), linseed oil (iodine value: 187 to 197), hempseed oil (iodine value: 141 to 175), sardine oil (iodine value: 163 to 195) and mackerel oil (iodine value: 136 to 178).

The fat or oil treated starch may also be, for example, oil treated starch in which soybean meal is used as the oil (JP-A-56-78572).

The fat or oil treated starch utilizing soybean meal may be obtained by mixing starch with, based on the starch weight, 0.1 to 20%, preferably 0.3 to 3% by weight of raw soybean powder and heating them at a temperature not more than 100° C., preferably 60° to 80° C., for 3 to 6 hours.

Starch used as a raw material of the fat or oil treated starch is not particularly limited. For example, it may be underground starch such as potato starch, sweet potato starch and tapioca starch, or ground starch such as wheat starch, corn starch, sago starch and rice starch. The starch may be in the form of powder, slurry, cake or the like.

The amount of fat or oil added to starch may be suitably selected depending on the kinds of starch and fat or oil and, for example, it is suitably added in a range of 0.1 to 5.0 parts by weight, preferably 0.5 to 2.0 parts by weight to 100 parts by weight of starch.

The fat or oil may be adsorbed on starch by mixing them together and, if necessary, aging them by heating to give fat or oil treated starch For example, fat or oil can be adsorbed on starch, when the starch is in the form of cake or powder, by spraying a solution or suspension of fat or oil in water or organic solvent on the starch, or, when the starch is in the form of slurry, dissolving or dispersing oil in the slurry and stirring the slurry. When certain kinds of fat or oil are used, fat or oil treated starch can be used without aging by heating. The aging can be performed by heating at 30° to 180° C. for 1 hour to 10 days. It is also possible to carry out simultaneously the heat aging and drying of starch which has been adsorbed with fat or oil in a wet state. The drying may be carried out by means of a dryer usually used for drying of starch such as a band dryer and flash dryer until an equilibrium moisture content of starch is obtained so that the fat or oil is uniformly adsorbed on the starch. However, when the starch is mixed with resin, it preferably has a moisture content of not more than 1% so that aging is performed sufficiently.

In the present invention, gelatinized products of the fat or oil treated starch described above may also be used.

Gelatinization of starch generally means a phenomenon caused by heating starch in the presence of water where the starch particles are irreversibly swelled or dissolved and lose their crystallinity and birefringence and viscosity of the starch is increased. The "gelatinized product of starch" used in the present invention is a starch material Showing substantially no crystallinity and birefringence. Loss of crystallinity and birefringence may be detected by studying starch particles by a polarization microscope and, when polarization crosses crossing at formation centers of the particles having been observed in the particles not gelatinized are lost, the starch may be considered gelatinized.

Gelatinized products of the fat or oil treated starch may be obtained by mixing fat or oil treated starch and water or water and a plasticizer under heating.

The gelatinization of the fat or oil treated starch may be carried out in the presence of water alone. The fat or oil treated starch may also be gelatinized in the presence of water and a plasticizer and, in this case, the amount of water may be reduced and it is advantageous for preventing foaming upon molding. Further, the plasticizer may also be advantageously added to the gelatinized product to make easy to mix the fat or oil treated starch with a biodegradable resin and to mold the resulting mixture.

The plasticizer used for the gelatinization is not particularly limited so long as it can gelatinize the fat or oil treated starch and impart plasticity to the gelatinized product, and it may be, for example, biodegradable plasticizers having a high boiling point. Examples of such plasticizers ethylene glycol, propylene glycol, glycerin, sorbitol, polyethylene glycol, polypropylene glycol and the like.

When water is used for the gelatinization, it is suitable to use 10 to 50 parts by weight of water for 100 parts by weight of the fat or oil treated starch (dry weight) in order to sufficiently gelatinize the starch. Further, it is particularly suitable to use 10 to 20 parts by weight of water for 100 parts by weight of the fat or oil treated starch (dry weight) in order to sufficiently gelatinize the starch and, in addition, to prevent foaming when gelatinized product is added to the biodegradable compositions and molded.

When water and a plasticizer are used for the gelatinization, 0.1 to 40 parts by weight of water and 1 to 100 parts by weight of plasticizer may suitably be used for 100 parts by weight of fat or oil treated starch (dry weight) in order to sufficiently gelatinize the starch and to impart sufficient plasticity to the gelatinized product. Further, 0.1 to 20 parts by weight of water and 5 to 40 parts by weight of plasticizer may be particularly suitably used for 100 parts by weight of fat or oil treated starch (dry weight) in order to sufficiently gelatinize the starch and to prevent foaming when gelatinized product is added to the biodegradable compositions and molded as well as to impart sufficient plasticity to the gelatinized product.

Temperature and duration of heating and kneading for the gelatinization of fat or oil treated starch may be suitably selected depending on the kinds of fat or oil treated starch and plasticizers (when used) and addition amounts of water and plasticizers. However, heating and kneading may be suitably carried out at 60° to 220° C. for 10 to 60 minutes. The heating and the kneading may be carried out by, for example, a pressurized kneader or extruder. The resulting gelatinized starch may be pelletized by subsequent mixing with biodegradable resins.

The biodegradable resins used for the present invention are not particularly limited so long as they have biodegradability by themselves. Considering moldability, they are suitably thermoplastic resins. For example, they may be selected from synthetic resins such as aliphatic polyesters, polycaprolactones, polylactic acids and polyvinyl alcohols, those resins derived from microorganisms such as polyhydroxybutyrate/valerate copolymers and those derived from naturally occurring materials such as acetylcelluloses and the like. More specifically, they may be preferably selected from, considering biodegradability, aliphatic polyesters having an average molecular weight of 30,000 to 40,000 produced from diols and dicarboxylic acids, polycaprolactones having an average molecular weight of 40,000 to 70,000, polylactic acids having an average molecular weight of 80,000 to 120,000, polyvinyl alcohols having an average molecular weight of 20,000 to 90,000, polyhydroxybutyrate/valerate copolymers having a hydroxyvalerate content of 0 to 40 mole %, acetylcelluloses having an acetylation degree of 43 to 55%, methylcelluloses having a methoxy content of 27.5 to 31.5% and ethylcelluloses having a ethoxy content of 47.5 to 49.0%.

When a gelatinized product of the fat or oil treated starch is used for the composition of the present invention, the biodegradable resin is preferably an aliphatic polyester because of its compatibility with the gelatinized product of the fat or oil treated starch. The compositions of the present invention containing an aliphatic polyester as the biodegradable resin show mechanical properties substantially comparable to those shown by the resin alone and its biodegradability is much more excellent as compared with that of the resin itself. The aliphatic polyester may be, for example, polycondensates of polybasic acids including dibasic acids and polyols including diols, polycondensates of hydroxyacids, ring-opening polymerization products of lactones and the like, which may be hydrolyzed by the action of lipase. Specifically, it may be selected from polyethylene adipates, polypropiolactones, polycaprolactones, polylactic acids, poly-β-hydroxybutyric acids, poly-β-hydroxybutyrates, copolymers thereof and mixtures thereof.

When fat or oil treated starch is used, the biodegradable compositions of the present invention suitably comprise, for example, 10 to 70% by weight, preferably 30 to 50% by weight of fat or oil treated starch and 90 to 10% by weight, preferably 70 to 50% by weight of a biodegradable resin. When the fat or oil treated starch content is equal to or exceed 10% by weight, improvement of biodegradability due to the starch content becomes significant, and when the content is not more than 70% by weight, molding of the composite may be carried out in a manner similar to that for usual resins. The fat or oil treated starch and the biodegradable resin may be heated and kneaded at a temperature of 60° to 220° C. for 10 to 60 minutes to give a composite material.

When a gelatinized product of the fat or oil treated starch is used, the biodegradable compositions of the present invention suitably comprise, for example, 10 to 99% by weight, preferably 50 to 95% by weight (dry weight) of the gelatinized product of the fat or oil treated starch and 90 to 1% by weight, preferably 50 to 5% by weight of a biodegradable resin. When the content of the gelatinized product of the fat or oil treated starch is equal to or exceed 10% by weight, improvement of biodegradability due to the addition of the gelatinized product of the fat or oil treated starch becomes significant and, in particular, when it exceeds 50% by weight, the improvement is remarkable. When the content is not more than 99% by weight, its moldability is not seriously affected and, in particular, when it is not more than 95% by weight, it shows moldability substantially comparable to usual resins.

The compositions of the present invention may comprise, in addition to the components described above, suitable additives, if necessary. For example, they may comprise vegetable proteins, pulp, UV stabilizers, microbicides, herbicides, fertilizers, antioxidants, surfactants, pigments and the like.

The composition of the present invention can be produced by heating and kneading a fat or oil treated starch or a gelatinized product thereof and a biodegradable resin at a temperature above the melting temperature of the biodegradable resin. For example, it can be prepared by heating and kneading a fat or oil treated starch or a gelatinized product thereof and a biodegradable resin at a temperature of from 60° to 220° C. for 10 to 60 minutes. As described above, a fat or oil treated starch or a gelatinized product thereof may be preliminarily pelletized and the resulting pellets may be heated and kneaded together with pellets of a biodegradable resin and molded by injection molding machines, extrusion molding machines and the like.

Further, the composition of the present invention containing a gelatinized product of fat or oil treated starch and a biodegradable resin can also be produced by heating and kneading fat or oil treated starch and a biodegradable resin at a temperature above the melting temperature of the biodegradable resin in the presence of water or water and a plasticizer.

In this case, 10 to 50 parts by weight of water is suitably used for 100 parts by weight of fat or oil treated starch (dry weight) like in the production of the gelatinized product itself. Further, with respect to the ratio of the fat or oil treated starch, water and the plasticizer, 0.1 to 40 parts by weight of water and 1 to 100 parts by weight of the plasticizer may be suitably used for 100 parts by weight of the fat or oil treated starch (dry weight).

The compositions of the the present invention can be molded by conventional techniques used for molding resin articles. Shapes, uses and the like of the molded articles are not particularly limited. For example, they may be molded into sheets, films, containers and the like. They may also be molded into pellets and used for secondary processes.

The compositions of the the present invention utilize fat or oil treated starch or gelatinized products thereof. Therefore, mechanical properties of films, sheets and the like obtained from the compositions by hot press molding, inflation molding, blow molding or the like are not reduced so much as in the case utilizing untreated starch. In particular, tensile strength comparable to that of the used resin alone may be maintained and modulus is even increased as compared with the resin alone.

According to the present invention, by using fat or oil treated starch or its gelatinized products, which can be obtained by slightly processing starch at low cost and have improve compatibility and interfacial adhesion with the biodegradable resin, there can be obtained biodegradable compositions of which mechanical properties are not significantly reduced and which have an increased starch content and good moldability.

Conventional biodegradable resins are more expensive than usual thermoplastic resins and are considered difficult to be produced at a cost comparable to the usual resins even in future. According to the present invention, by adding inexpensive starch to form composite materials, price of biodegradable plastics can be lowered and, in addition, their biodegradability is improved. Thus, the present invention will be able to enlarge application range of biodegradable plastics as wide as usual resins.

EXAMPLES

The present invention will be further explained by referring to the following examples.

Example 1

To 100 parts by weight of corn starch, 2 parts by weight of safflower oil was added, uniformly mixed by a Henschel mixer (Mitui Miike Kakoki) and then dried in a box dryer heated at 120° C. so that the product has a moisture content of not more than 0.3% to give safflower oil treated corn starch.

The safflower oil treated corn starch and a commercially available biodegradable aliphatic polyester resin (BIONOLE #1000, Showa Kobunshi, number average molecular weight: 35,000) were mixed in a weight ratio of 30:70 and kneaded in a Brabender Plastograph heated at 180° C. for 15 minutes to produce a composite composition of the present invention.

The obtained composite material was hot molded by an desk-top test press (Toyo Seiki Seisakusho) under a pressure of 100 kgf/cm² at 180° C. to give a sheet having a thickness of 0.4 mm. Test strips having a width of 5 mm and a length of 80 mm were cut from the sheet and their mechanical properties were examined by a tensile test machine (Orientec). Tensile test was carried out using a 100 kgf load cell and a span length of 40 mm at a crosshead speed of 5 mm/minute. From the results of this tensile test, the following mechanical properties were calculated in accordance with the following equations:

Tensile strength (kgf/cm²)=Breaking load (kgf)/Sectional area (cm²)

Breaking elongation rate (%)=[(Breaking elongation - Span length)/Span length]×100

Modulus (kgf/cm²)=Proportionally reduced stress/Distortion

Results are shown in Table 1.

Comparative Example 1

A composite material was produced in the same manner as in Example 1 except that the safflower oil treated corn starch was replaced with untreated corn starch having a moisture content of not more than 0.3%, and its mechanical properties were examined by the same test. Results are shown in Table 1.

Comparative Example 2

A sheet was produced without using the safflower oil treated corn starch, i.e., a sheet was obtained from the commercially available biodegradable polyester resin alone, and its mechanical properties were examined by the same test as in Example 1. Results are shown in Table 1.

TABLE 1

| Mechanical properties | Example 1 (oil treated starch) | Comparative Example 1 (untreated starch) | Comparative Example 2 (resin alone) |
|---|---|---|---|
| Tensile strength (kgf/cm²) | 311 | 149 | 295 |
| Breaking elongation (%) | 13.4 | 6.65 | 22.9 |
| Modulus (kgf/cm²) | 6,497 | 4,954 | 3,338 |

As shown in Table 1, the sheet of Example 1 utilizing the oil treated starch exhibited less reduction of tensile strength and breaking elongation as compared with the sheet utilizing the untreated starch.

Heat characteristics of the composite materials produced in Example 1 and Comparative Example 1 and the aliphatic biodegradable polyester resin were examined by the heating rate test and the constant temperature test by means of a flow tester (CFT500C, Shimazu Seisakusho). The measurements were carried out by employing a die having a length of 2 mm and a diameter of 1 mm in both of the test and, in the heating rate test, they were carried out under a load of 10 kgf at a heat-up rate of 5° C./minute in a range of 50° to 200° C. In the constant temperature test, the measurements were carried out under a load of 5 kgf at a melting temperature of 190° C. Heat softening temperature and heat fluidizing temperature were measured by the heating rate test, and melt viscosity, shear rate and flow rate were measured by the constant temperature test. Results are shown in Table 2.

TABLE 2

|  | Example 1 (oil treated starch) | Comparative Example 1 (untreated starch) | Comparative Example 2 (resin alone) |
|---|---|---|---|
| Heat flow characteristics |  |  |  |
| Heat softening temperature (°C.) | 88 | 90 | 86 |
| Heat fluidizing temperature (°C.) | 113 | 113 | 114 |
| Heat melting characteristics |  |  |  |
| Melt viscosity ($\eta$) (poise) | 6,560 | 7,009 | 5,068 |
| Shear rate ($v$) ($S^{-1}$) | 95.36 | 88.07 | 121.2 |
| Flow rate (Q) (cm³/s) | $9.36 \times 10^{-3}$ | $8.65 \times 10^{-3}$ | $1.19 \times 10^{-2}$ |

As shown in Table 2, heat characteristics of the composite materials of Example 1 are substantially comparable to those of Comparative Example 2 where the resin alone was used and therefore it is considered that the composite material of the present invention can be molded under conditions similar to those used for the molding of conventional resins.

The test strips produced in Example 1 were subjected to the activated sludge test and the burying-in-soil test. As comparison materials, the material of Comparable Example 2 and a low density polyethylene (Idemitsu Kosan) were used. Results are shown in Table 3. It is considered that, in the composite material of the present invention containing the oil treated starch, the starch was preferentially degraded by microorganisms, enzymes and the like to produce a porous structure, thereby promoting biodegradation of the aliphatic polyester resin chains.

TABLE 3

|  | Example 1 (oil treated starch) | Comparative Example 2 (resin alone) | Polyethylene |
|---|---|---|---|
| Activated sludge test |  |  |  |
| After 2 weeks | slightly degraded | Not degraded | Not degraded |
| After 1 month | Fairly degraded | Slightly degraded | Not degraded |
| After 3 months | Fairly degraded | Slightly degraded | Not degraded |

TABLE 3-continued

| | Example 1 (oil treated starch) | Comparative Example 2 (resin alone) | Polyethylene |
|---|---|---|---|
| Burying-in-soil test | | | |
| After 1 month | Slightly degraded | Slightly degraded | Not degraded |
| After 3 months | Fairly degraded | Slightly degraded | Not degraded |

Example 2

To 100 parts by weight (in terms of solid content of starch) of tapioca starch wet cake containing about 40% of water, 4 parts by weight of soybean meal was added, uniformly mixed in a kneader (Model DS1, Moriyama Seisakusho) and partially dried in a box dryer heated at 90° C. for 30 minutes. Then the mixture was further dried in the box dryer heated at 120° C. so that the mixture has a moisture content of not more than 0.3% as a product to give soybean meal treated tapioca starch.

The soybean meal treated tapioca starch and a commercially available polyhydroxybutyrate/valerate copolymer (BIOPOLE D410G, Zeneka, hydroxyvalerate content: 8 mole %) were mixed in a weight ratio of 50:50 and kneaded at 170° C. for 15 minutes to produce a composite composition of the present invention. Mechanical properties of the composite material were examined in the same manner as in Example 1. Results are shown in Table 4.

Comparative Example 3

A composite material was produced in the same manner as in Example 2 except that the soybean meal treated tapioca starch was replaced with untreated tapioca starch having a moisture content of not more than 0.3%. Its mechanical properties were examined by the same manner as in Example 1. Results are shown in Table 4.

Comparative Example 4

A sample sheet was produced in the same manner as in Example 2 except that the soybean meal treated tapioca starch was not used, i.e., the commercially available polyhydroxybutyrate/valerate copolymer alone was used. The obtained sheet was evaluated in the same manner as in Example 1 except that the pressurizing temperature was 180° C. Results are shown in Table 4.

As shown in Table 4, the composite composition of Example 2 according to the present invention exhibited more excellent mechanical properties as compared with the material of Comparative Example 3 utilizing the untreated starch. Further, the composite composition of Example 2 according to the present invention exhibited mechanical properties substantially comparable to those of the material of Comparative Example 4 made from the resin alone.

TABLE 4

| Mechanical properties | Example 2 (oil treated starch) | Comparative Example 3 (untreated starch) | Comparative Example 4 (resin alone) |
|---|---|---|---|
| Tensile strength (kgf/cm$^2$) | 170 | 122 | 217 |
| Breaking elongation (%) | 4.5 | 2.0 | 6.7 |
| Modulus (kgf/cm$^2$) | 8,820 | 9,092 | 8,178 |

Example 3

To 100 parts by weight of corn starch, 2 parts by weight of soybean oil was added, uniformly mixed in a SUPER-MIXER (Kawada Seisakusho) and overdried in a box dryer so that the product has a moisture content of not more than 0.3% to give soybean oil treated starch.

The soybean oil treated starch and a commercially available polycaprolactone having a molecular weight of 40,000 (PLACCEL H4, Daicel Kagaku) were mixed in a weight ratio of 40:60 and pelletized into uniform columnar pellets having a diameter of 3 mm composed of the composition of the present invention by means of a double-screw extruder having a screw diameter of 20 mm, L/D 25, heated at 100° C. The production of sheet was performed in the same manner as in Example 1 except that the pressurizing temperature was 100° C. Mechanical properties of the obtained sheet were measured in the same manner as in Example 1. Results are shown in Table 5.

The obtained sheet was buried in soil at a depth of 15 cm from the ground surface and, 2 months later, it was found that the shape of the sheet had been collapsed.

Comparative Example 5

A composite material was produced in the same manner as in Example 3 except that the soybean oil treated starch was replaced with untreated corn starch. Results of measurements of its mechanical properties are shown in Table 5.

Comparative Example 6

A sheet was produced in the same manner as in Example 3 except that the soybean oil treated starch was not used, i.e., it was made from the polycaprolactone resin alone. Results of mechanical property measurements of the resulting sheet are shown in Table 5.

TABLE 5

| Mechanical properties | Example 3 (oil treated starch) | Comparative Example 5 (untreated starch) | Comparative Example 6 (resin alone) |
|---|---|---|---|
| Tensile strength (kgf/cm$^2$) | 119 | 70.5 | 140 |
| Breaking elongation (%) | 184 | 138 | 460 |
| Modulus (kgf/cm$^2$) | 6,864 | 6,006 | 4,290 |

Example 4

To 100 parts by weight of corn starch, 1 parts by weight of linseed oil was added, uniformly mixed in a plain mixer (Takara Koki) and dried in a box dryer heated at 100° C. so that the mixture has a moisture content of not more than 0.3% as a product to give linseed oil treated starch.

The linseed oil treated starch and a polylactic acid having an average molecular weight of 120,000 (Shimazu Seisakusho) were mixed in a weight ratio of 30:70 and pelletized into uniform columnar pellets having a diameter of 3 mm composed of the composition of the present invention by means of a labo plastomill (Toyo Seiki Seisakusho) heated at 180° C. The production of sheet was performed in the same manner as in Example 1 except that the pressurizing temperature was 180° C. Mechanical properties of the obtained sheet were measured in the same manner as in Example 1. Results are shown in Table 6.

Comparative Example 7

A composite material was produced in the same manner as in Example 4 except that the linseed oil treated corn starch was replaced with untreated corn starch. Results of measurements of its mechanical properties are shown in Table 6.

Comparative Example 8

A sheet was produced in the same manner as in Example 4 except that the linseed oil treated corn starch was not used, i.e., it was made from the polylactic acid resin alone. Results of measurements of its mechanical properties are shown in Table 6.

TABLE 6

| Mechanical properties | Example 4 (oil treated starch) | Comparative Example 7 (untreated starch) | Comparative Example 8 (resin alone) |
| --- | --- | --- | --- |
| Tensile strength (kgf/cm$^2$) | 560 | 335 | 660 |
| Breaking elongation (%) | 1.6 | 2.3 | 4 |
| Modulus (kgf/cm$^2$) | 28,200 | 29,680 | 20,000 |

Example 5

Safflower oil treated corn starch obtained in the same manner as in Example 1 and having a moisture content of 1.0% and a commercially available biodegradable aliphatic polyester resin (BIONOLE #1000, Showa Kobunshi, number average molecular weight: 35,000) were mixed in a weight ratio of 60:40 based on their dry weights and added with 40 parts by weight of glycerin per 100 parts by weight of the starch (dry weight). The mixture was kneaded in a double-screw extruder (Toyo Seiki) at a kneading zone temperature of 130° C. and extruded into rods having a diameter of about 3 mm. The rods were then cut into a length of 2 to 3 mm to give pellets composed of the composition of the present invention.

The obtained pellets were hot molded by a desk-top test press (Toyo Seiki Seisakusho) under an applied weight of 100 kgf/cm$^2$ at 150° C. to give a sheet having a thickness of 0.4 mm. Test strips having a width of 5 mm and a length of 80 mm were cut from the sheet and their mechanical properties were examined by a tensile test machine (Orientec). Tensile test was carried out at a crosshead speed of 5 mm/minute using a 100 kgf load cell and a span length of 40 mm. From the results of this tensile test, the mechanical properties shown in Table 7 were calculated in accordance with the equations mentioned in Example 1.

Results are shown in Table 7.

Comparative Example 9

Pellets were produced in the same manner as in Example 5 except that the safflower oil treated corn starch was replaced with a gelatinized product of untreated corn starch having a moisture content of 1.0% and, from the obtained pellets, a hot pressed sheet was produced and cut into test strips, of which mechanical properties were examined by the same test. Results are shown in Table 7.

Comparative Example 10

A sheet was produced without using the safflower oil treated corn starch, i.e., a sheet was obtained from the commercially available biodegradable polyester resin alone, and its mechanical properties were examined in the same manner as in Example 5. Results are shown in Table 7.

As shown in Table 7, the composition of Example 5 utilizing the oil treated starch exhibited mechanical properties substantially comparable to those of the material of Comparative Example 10 which was made from the resin alone and those more excellent than the material of Comparative Example 9 utilizing the untreated starch.

TABLE 7

| Mechanical properties | Example 5 (oil treated starch) | Comparative Example 9 (untreated starch) | Comparative Example 10 (resin alone) |
| --- | --- | --- | --- |
| Tensile strength (kgf/cm$^2$) | 308 | 160 | 312 |
| Breaking elongation (%) | 15.2 | 8.9 | 21 |
| Modulus (kgf/cm$^2$) | 5,520 | 4,623 | 4,219 |

The test strips produced in Example 5 (5 mm×80 mm) were subjected to the activated sludge test where the strips were introduced into a standard activated sludge aeration tank and the burying-in-soil test where the strips were buried in soil at a depth of 15 cm from the ground surface. As comparison samples, test strips produced from the material of Comparison Example 10 and a low density polyethylene (Idemitsu Kosan) were used. Results are shown in Table 8. It is considered that, in the composite material of the present invention containing the oil treated starch, the starch was preferentially degraded by microorganisms, enzymes and the like to produce a porous structure, thereby promoting biodegradation of the aliphatic polyester resin chains.

TABLE 8

| | Example 5 (oil treated starch) | Comparative Example 10 (resin alone) | Polyethylene |
| --- | --- | --- | --- |
| Activated sludge test | | | |
| After 2 weeks | Fairly degraded | Not degraded | Not degraded |
| After 1 month | Degraded almost all | Slightly degraded | Not degraded |
| After 3 months | Degraded almost all | Slightly degraded | Not degraded |
| Burying-in-soil test | | | |
| After 1 month | Fairly degraded | Slightly degraded | Not degraded |
| After 3 months | Degraded almost all | Slightly degraded | Not degraded |

Example 6

Soybean meal treated tapioca starch obtained in the same manner as in Example 2 and a commercially available polyhydroxybutyrate/valerate copolymer (BIOPOLE D410G, Zeneka, hydroxyvalerate content: 8 mole %) were mixed in a weight ratio of 50:50 based on their dry weights and added with 15 parts by weight of water and 20 parts by weight of glycerin per 100 parts by weight of the starch (dry weight). The mixture was kneaded in a double-screw extruder (Toyo Seiki) at a kneading zone temperature of 170° C. and extruded into rods having a diameter of about 3 mm. The rods were then cut into a length of 2 to 3 mm to give pellets composed of a composition of the present invention.

Test strips were produced from the pellets and their mechanical properties were tested in the same manner as in Example 5 except that the pressurizing temperature was 180° C. Results are shown in Table 9.

Comparative Example 11

Pellets were produced in the same manner as in Example 6 except that the soybean meal treated tapioca starch was replaced with untreated tapioca starch having a moisture content of 13% (15 parts by weight of water per 100 parts by weight of the starch based on its dry weight) and test strips were prepared from the pellets. Their mechanical properties were examined in the same manner as in Example 5. Results are shown in Table 9.

Comparative Example 12

A sample sheet was produced in the same manner as in Example 6 except that the soybean meal treated tapioca starch was not used, i.e., the commercially available polyhydroxybutyrate/valerate copolymer alone was used. The obtained sheet was evaluated in the same manner as in Example 5 except that the pressurizing temperature was 180° C. Results are shown in Table 9.

As shown in Table 9, the composition of Example 6 according to the present invention exhibited more excellent mechanical properties as compared with the material of Comparative Example 11 utilizing the untreated starch. Further, the composition of Example 6 according to the present invention exhibited mechanical properties substantially comparable to those of the material of Comparative Example 12 made from the resin alone.

TABLE 9

| Mechanical properties | Example 6 (oil treated starch) | Comparative Example 11 (untreated starch) | Comparative Example 12 (resin alone) |
|---|---|---|---|
| Tensile strength (kgf/cm$^2$) | 198 | 108 | 217 |
| Breaking elongation (%) | 5.5 | 3.5 | 6.7 |
| Modulus (kgf/cm$^2$) | 8,250 | 7,840 | 8,178 |

Example 7

20 parts by weight of water and 15 parts by weight of ethylene glycol were added to 100 parts by weight of soybean oil treated corn starch obtained in the same manner as in Example 3, kneaded in a double-screw extruder (Toyo Seiki) at a kneading zone temperature of 130° C. and extruded into rods having a diameter of about 3 mm. The rods were then cut into a length of 2 to 3 mm to give pellets composed of a gelatinized product of the soybean oil treated corn starch.

The obtained pellets of gelatinized product of soybean oil treated corn starch and a polycaprolactone having a molecular weight of 70,000 (PLACCEL H7, Daicel Kagaku) were mixed in a weight ratio of 70:30, kneaded in a double-screw extruder (Toyo Seiki) at kneading zone temperature of 130° C and extruded into rods having a diameter of about 3 mm. The rods were then cut into a length of 2 to 3 mm to give pellets composed of a composition of the present invention.

A sheet was produced from the pellets in the same manner as in Example 5 except that the pressurizing temperature was 130 ° C. Mechanical properties of the obtained sheet were measured in the same manner as in Example 5. Results are shown in Table 10.

The obtained sheet was buried in soil at a depth of 15 cm from the ground surface and, 2 months later, it was found that the shape of the sheet had been collapsed.

Comparative Example 13

A sheet was produced in the same manner as in Example 7 except that used were pellets of a gelatinized product of untreated corn starch produced by using untreated corn starch instead of the soybean oil treated starch. Results of its mechanical property measurements are shown in Table 10.

Comparative Example 14

A sheet was produced in the same manner as in Example 7 except that the soybean oil treated corn starch was not used, i.e., the sheet was produced from the polycaprolactone alone. Results of mechanical property measurements of the obtained sheet are shown in Table 10.

As shown in Table 10, the composition of Example 7 utilizing the oil treated starch according to the present invention exhibited tensile strength comparable to that of the material of Comparative Example 14 made from the resin alone, while its break elongation is slightly inferior to that of the same comparative material. Further, the composition of the present invention has more excellent mechanical properties as compared with the material of Comparative Example 13 utilizing the untreated starch.

TABLE 10

| Mechanical properties | Example 7 (oil treated starch) | Comparative Example 13 (untreated starch) | Comparative Example 14 (resin alone) |
|---|---|---|---|
| Tensile strength (kgf/cm$^2$) | 155 | 110 | 154 |
| Breaking elongation (%) | 593 | 360 | 960 |
| Modulus (kgf/cm$^2$) | 3,475 | 3,037 | 2,620 |

Example 8

Linseed oil treated corn starch obtained in the same manner as in Example 4 and having a moisture content of 1% and a polylactic acid having an average molecular weight of 120,000 (Shimazu Seisakusho) were mixed in a weight ratio of 70:30 based on their dry weights, added with 30 parts by weight of propylene glycol per 100 parts by weight of the starch (based on dry weight) and pelletized into uniform columnar pellets having a diameter of 3 mm composed of a composition of the present invention by means of a laboratory plastomill (Toyo Seiki Seisakusho) heated at 180° C. The production of sheet was performed in the same manner as in Example 5 except that the pressurizing temperature was 180° C. Mechanical properties of the obtained sheet were measured in the same manner as in Example 5. Results are shown in Table 11.

Comparative Example 15

A sheet was produced in the same manner as in Example 8 except that the linseed oil treated corn starch was replaced with untreated corn starch. Results of its mechanical property measurements are shown in Table 11.

Comparative Example 16

A sheet was produced in the same manner as in Example 8 except that the linseed oil treated corn starch was not used, i.e., it was made from the polylactic acid resin alone. Results of measurements of its mechanical properties are shown in Table 11.

As shown in Table 11, the composition of Example 8 utilizing the oil treated starch exhibited mechanical properties substantially comparable to those of the material of Comparative Example 16 made from the resin alone and those more excellent than the material of Comparative Example 15 utilizing the untreated starch.

TABLE 11

| Mechanical properties | Example 8 (oil treated starch) | Comparative Example 15 (untreated starch) | Comparative Example 16 (resin alone) |
|---|---|---|---|
| Tensile strength (kgf/cm$^2$) | 580 | 320 | 660 |
| Breaking elongation (%) | 2.9 | 2.4 | 4 |
| Modulus (kgf/cm$^2$) | 26,400 | 24,600 | 20,000 |

What is claimed is:

1. A biodegradable composition comprising fat or oil treated starch and a biodegradable resin selected from the group consisting of aliphatic polyesters, polyvinyl alcohols and acetylcelluloses.

2. A composition of claim 1 wherein the fat or oil treated starch has been produced by allowing one or more compounds selected from the group consisting of fats, oils, substances analogous to fats or oils, aliphatic acids and aliphatic acid derivatives to adsorb on starch and aging them.

3. A composition of claim 1 wherein the aliphatic polyester is selected from the group consisting of polycaprolactones, polylactic acids and polyhydroxybutyrate/valerate copolymers.

4. A composition of claim 1 wherein content of the fat or oil treated starch is in a range of 20 to 70% by weight and content of the biodegradable resin is in a range of 80 to 30% by weight.

5. A biodegradable composition comprising a gelantinized product of fat or oil treated starch and a biodegradable resin selected from the group consisting of aliphatic polyesters, polyvinyl alcohols and acetylcelluloses.

6. A composition of claim 5 wherein the fat or oil treated starch has been produced by allowing one or more compounds selected from the group consisting of fats, oils, substances analogous to fats or oils, aliphatic acids and aliphatic acid derivatives to adsorb on starch and aging them.

7. A composition of claim 5 wherein the aliphatic polyester is selected from the group consisting of polycaprolactones, polylactic acids and polyhydroxybutyrate/valerate copolymers.

8. A composition of claim 5 wherein the gelatinized product of fat or oil treated starch has been produced by gelatinizing fat or oil treated starch in the presence of water or water and a plasticizer.

9. A composition of claim 5 wherein content (based on dry weight) of the gelatinized product of fat or oil treated starch is in a range of 10 to 99% by weight and content (based on dry weight) of the biodegradable resin is in a range of 90 to 1% by weight.

10. A process for producing the composition of claim 5 which comprises heating and kneading fat or oil treated starch and a biodegradable resin in the presence of water or water and a plasticizer.

11. A process of claim 10 wherein a weight ratio of the fat or oil treated starch and the biodegradable resin (based on their dry weights) is in a range of 10:90 to 99:1 and 10 to 50 parts by weight of water per 100 parts by weight of the fat or oil treated starch (dry weight) is present.

12. A process of claim 10 wherein a weight ratio of the fat or oil treated starch and the biodegradable resin (based on their dry weights) is in a range of 10:90 to 99:1 and 0.1 to 40 parts by weight of water and 1 to 100 parts by weight of the plasticizer per 100 parts by weight of the fat or oil treated starch (dry weight) are present.

* * * * *